United States Patent [19]
Plesh

[11] Patent Number: 5,598,638
[45] Date of Patent: Feb. 4, 1997

[54] ELECTRICAL STICK

[76] Inventor: Anthony L. Plesh, 21 Casper Berger Rd., Whitehouse Station, N.J. 08889

[21] Appl. No.: 346,767

[22] Filed: Nov. 30, 1994

[51] Int. Cl.$^6$ .............................. B25B 11/00; B23Q 3/00
[52] U.S. Cl. ..................... 33/528; 33/613; 33/DIG. 10; 269/904
[58] Field of Search ............................. 33/528, DIG. 10, 33/613; 269/904

[56] References Cited

U.S. PATENT DOCUMENTS

| | | | |
|---|---|---|---|
| 2,962,281 | 11/1960 | Hodgson | 33/DIG. 10 |
| 2,990,172 | 6/1961 | Gianotta | 33/DIG. 10 |
| 3,436,070 | 4/1969 | Utley et al. | 33/528 |
| 4,126,941 | 11/1978 | Clarke | 33/528 |
| 4,890,391 | 1/1990 | Warren | 33/DIG. 10 |
| 5,072,523 | 12/1991 | Bennett | 33/528 |
| 5,348,274 | 9/1994 | Breen | 33/DIG. 10 |
| 5,351,460 | 10/1994 | Small | 33/DIG. 10 |

Primary Examiner—Christopher W. Fulton
Attorney, Agent, or Firm—Thomas A. Beck; Baker & Friedman

[57] ABSTRACT

The present invention is directed to an Electrical Stick used to install electrical boxes. The Stick is made of a durable material as to prevent bending. The Stick has height indicators on both sides to ensure proper height when installing the electrical boxes. The Stick has box height indicators on both sides to make certain the installer keeps the electrical boxes uniform. The Stick has an arrow and an up sign to make certain the Stick is used properly.

10 Claims, 3 Drawing Sheets

5,598,638

ELECTRICAL STICK

1. FIELD OF THE INVENTION

This invention relates to the electrical field, specifically to the installation of electrical boxes.

2. BACKGROUND

During the construction of a building an electrician must install boxes for switches, receptacles, televisions, phones and for numerous other applications. In order to accomplish this, electricians would use a tape measure. This procedure is time consuming and not always the most accurate. Due to the bending in tape measures, when nailing on boxes it tends to cause some inaccuracies. Another problem with using a tape measure is after getting the correct height off of the floor; you need to bring the box off of the stud to bring the box flush with the finished wall, when it is installed at a later date. The box must be flush with the finished wall, or the fixture to be used in the box will not sit properly and may result in an unsafe condition. A tape measure is not any help when trying to successfully accomplish flushness with the finished wall and getting the proper height at the same time.

3. OBJECTS AND ADVANTAGES

Accordingly, several objects and advantages of the Electrical Stick are that it brings uniform accuracy to the installation of switches, receptacles, phones, televisions, and numerous other applications. The Electrical Stick is less time consuming than the tape measure. The Electrical Stick marks the exact height of the boxes, while at the same time, the electrician can bring the box off the stud for the depth of the finished wall. The Stick is more durable than a tape measure insuring proper heights. The Stick is very convenient to use and store when not in use. The Stick can also be used as a straight edge or other type of measuring device. Further objects and advantages of the Stick will become apparent from a consideration of the drawings and ensuing descriptions.

FIGURE 1

10. Stick
11. Upper Height Indicator
12. Upper Height Box Indicator
13. Middle Height Indicator
14. Middle Height Box Indicator
15. Arrow
16. Up Sign
17. Lower Height Indicator
18. Lower Height Box Indicator

FIGURE 2

10. Stick
11. Upper Height Indicator
13. Middle Height Indicator
17. Lower Height Indicator

FIGURE 3

10. Stick
11. Upper Height Indicator
12. Upper Height Box Indicator
24L. Top, Left Adjustable Clamp
24R. Top Right Adjustable Clamp
13. Middle Height Indicator
14. Middle Height Box Indicator
15. Arrow
16. Up Sign
29L. Bottom, Left Adjustable Clamp
29R. Bottom, Right Adjustable Clamp
17. Lower Height Indicator
18. Lower Height Box Indicator

FIGURE 4

10. Stick
11A. Extended, Upper Height Indicator
12. Upper Height Box Indicator
13A. Extended, Middle Height Indicator
14. Middle Height Box Indicator
15. Arrow
16. Up Sign
17A. Extended, Lower Height Indicator
18. Lower Height Box Indicator

FIGURE 5

10. Stick
11A. Extended, Upper Height Indicator
12. Upper Height Box Indicator
24L. Top, Left Adjustable Clamp
24R. Top, Right Adjustable Clamp
13A. Extended, Middle Height Indicator
14. Middle Height Box Indicator
29L. Bottom, Left Adjustable Clamp
29R. Bottom, Right Adjustable Clamp
17A. Extended, Lower Height Indicator
18. Lower Height Box Indicator

4. BRIEF DESCRIPTION OF DRAWINGS

5. DETAILED DESCRIPTION OF DRAWINGS

Figure 1:
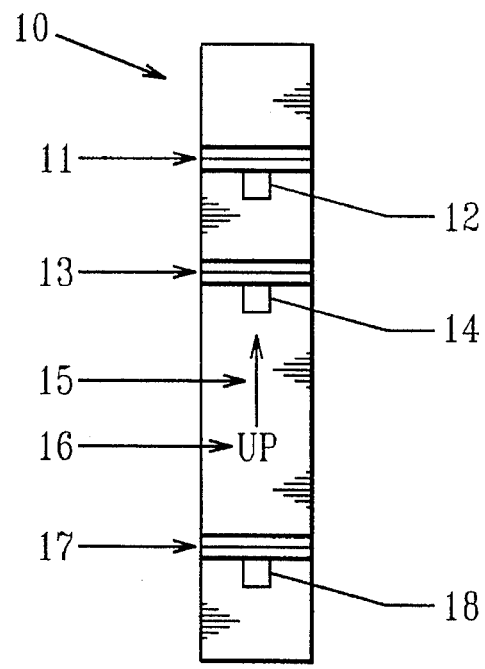
FIG. 1 is a front view of the Stick.

FIG. 1 shows a front view of a basic version of my stick for installing electrical boxes, which includes a Stick 10, a Upper Height Indicator 11, a Upper Height Box Indicator 12, a Middle Height Indicator 13, a Middle Height Box Indicator 14, a arrow 15, a Up Sign 16, a Lower Height Indicator 17, and a Lower Height Box Indicator 18. Stick 10 is constructed in one piece, which is produced from a durable type of material in order to withstand excessive use and prohibit any type of bending. The Stick 10 can range from 55 to 75 inches in length; 2¼ to 3 inches in width. The Stick 10 ranges from ¼ to 3 inches thick depending on the type of finished walls to be used. There are other various possibilities with regard to the Stick 10. The Stick 10 has markings on both sides to make for easier use. The Stick 10 displays the Upper Indicator 11 indented into the upper part of the Stick 10 to indicate the proper height of the boxes. Below the Upper Indicator 11 is the Upper Box Indicator 12 which shows where the box should be placed for uniform installation of boxes. Below the Upper Box Indicator 12 is the Middle Indicator 13 indented into the Stick 10, also used to indicate the proper height boxes at this height. The Middle Box Indicator 14 is underneath to keep uniform installation. Below The Middle Box Indicator 14 is an Arrow 15 which is used to show the proper direction in which the Stick 10 is to be used. The Up Sign 16 is another reference to help show which direction the Stick 10 should be properly used. Under the Up Sign 16 a Lower Indicator 17 is indented to indicate where the boxes are placed at this height. Finally, under the Lower Indicator 17 is the Lower Box Indicator 18 for the uniform installation.

Figure 2:
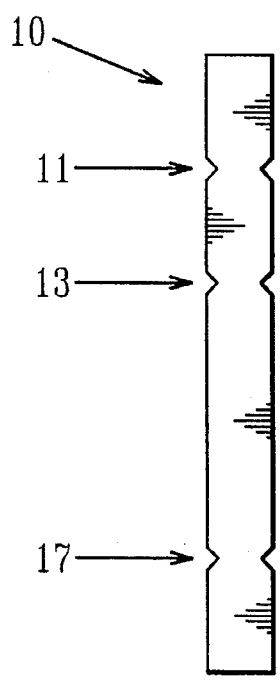
FIG. 2 shows a side view of the Stick.

FIG. 2 shows a side view of the basic version of the Stick 10 showing that the Upper Indicator 11, the Middle Indicator 13, and the Lower Indicator 17 are all indented on both sides of the Stick 10 for easier visibility.

Figure 3:
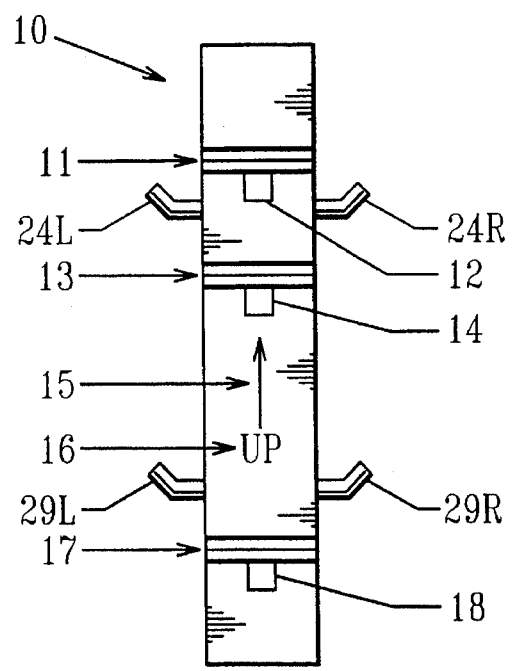
FIG. 3 shows a front view of the Stick with alternative clamps off the sides for holding the stick up against a stud.

FIG. 3 shows a variation of FIG. 1. FIG. 3 has all the features of FIG. 1 with the addition of Top Adjustable Clamps 24L and 24R along with Bottom Adjustable Clamps 29L and 29R. These Clamps 24L, 24R, 29L, and 29R are used to pull the Stick 10 against the stud to ensure that the box will be flush with the finished wall. The Clamps 24L, 24R, 29L, and 29R are made to be adjustable so that they can be made smaller or larger depending upon how many studs are together. The Top Clamps 24L and 24R would be placed under the Upper Box Indicator 12 and the Bottom Clamps 29L and 29R would be placed under the Up Sign 16. Each side of the Stick 10 would be furnished with the Clamps 24L, 24R, 29L, and 29R along with the Height Indicators 11, 13, and 17; and the Box Indicators 12, 14, and 18. Each side of the Stick 10 would also contain the Arrow 15 and the Up Sign 16.

Figure 4:
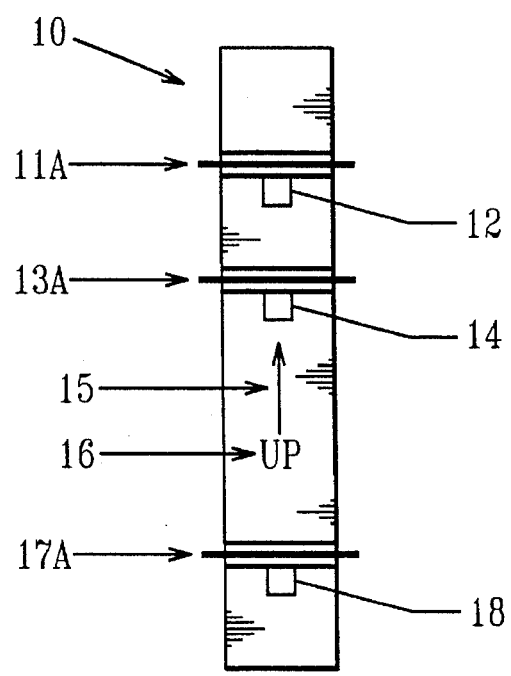
FIG. 4 shows a front view of the Stick with an alternative measuring gauge protruding off the sides of the Stick.

FIG. 4 shows another variation of FIG. 1. FIG. 4 has all the features of FIG. 1 except that in the place of the Upper Indicator 11 there will be an Extended Upper Height Indicator 11A protruding off the sides of the Stick 10. There will also be an Extended Middle Height Indicator 13A protruding off the sides of the Stick 10 instead of the indented Middle Indicator 13. Finally, there will be an Extended Lower Height Indicator 17A protruding off the sides of the Stick 10, instead of the indented Lower Indicator 17. Also on the Stick in FIG. 4 is the Arrow 15 and the Up Sign 16 located on both sides. Each Extended Indicators 11A, 13A, and 17A are used to make uniform box installation even easier yet.

Figure 5:
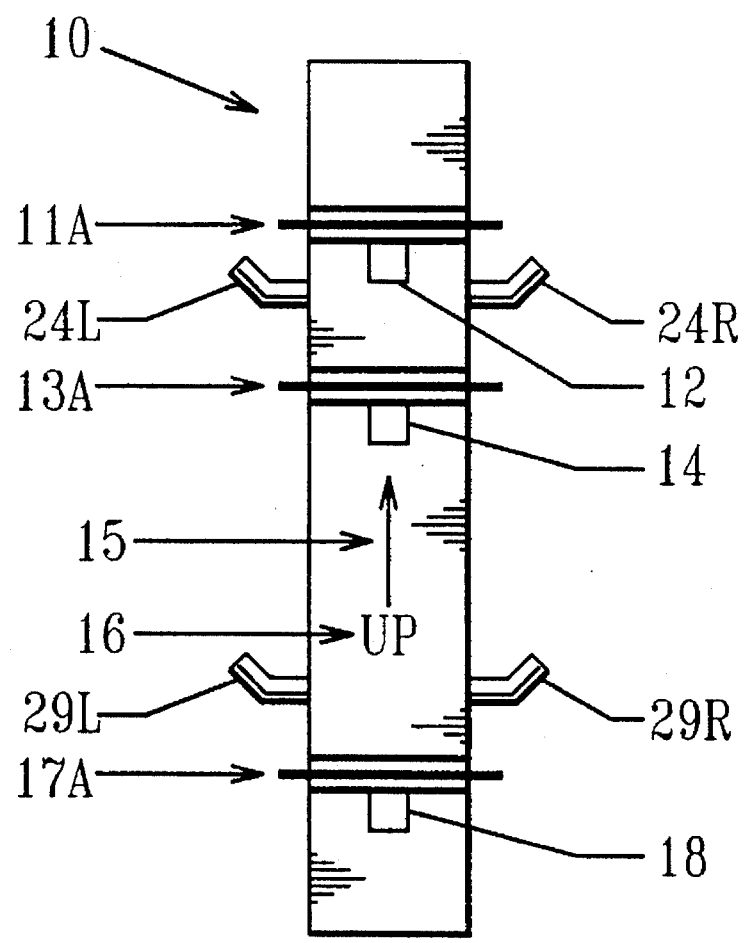
FIG. 5 shows a front view of the Stick with an alternative style which combines the features of the Stick in FIGS. 1, 2, 3, and 4.

FIG. 5 is another variation of FIG. 1 which combines the newer features of FIGS. 3 and 4. FIG. 5 shows the Extended Indicators 11A, 13A, and 17A along with the Clamps 24L, 24R, 29L, and 29R. These features combined create a uniform box installation by use of the Extended Indicators 11A, 13A, and 17A to mark exact locations and the Clamps 24L, 24R 29L, and 29R to pull the Stick 10 tightly against the studs, to make for flush boxes against the finished walls. All of the features would be placed onto both sides of the Stick 10.

6. Operation of Invention

The manner of using the Stick 10 to install electrical boxes is similar to that of using a tape measure. Namely, one would place place the Stick 10 shown in FIG. 1 up against a stud, making certain your Arrow 15 and Up Sign 16 are in the proper direction. Using your foot to hold the Stick 10 tightly against the stud, place the electrical box next to the Stick 10 at the proper Box Indicator 12, 14, and 18 bringing the box flush with the Stick 10 and nail the box into the stud.

FIG. 3 shows a similar method of operation to that of FIG. 1. One would place the Stick 10 shown in FIG. 3, up against a stud. Make certain your Arrow 15 and Up Sign 16 are in the proper direction. With the Clamps 24L, 24R, 29L, and 29R securely fastened around the stud, place the electrical box flush with the Stick 10 at the proper Box Indicator 12, 14, and 18. Nail the box into the stud.

FIG. 4 shows a similar method of operation as FIG. 1. One would place the Stick 10 up against a stud making certain your Arrow 15 and Up Sign 16 are in the proper direction. Using your foot hold the Stick 10 tightly against the stud. Place the electrical box flush with the Stick 10, under the Extended Indicator 11A, 13A, and 17A. Finally, nail the box into the stud.

FIG. 5 shows a similar method of operation as FIG. 1, but applies the added features of FIG. 3 and FIG. 4. One would place the Stick 10 shown in FIG. 5 up against a stud, making certain your Arrow 15 and Up Sign 16 are in the proper direction. With the Clamps 24L, 24R, 29L, and 29R securely fastened to the stud, place the electrical box flush with the Stick 10, under the Extended Indicator 11A, 13A, and 17A. Nail the electrical box into the stud.

7. SUMMARY, RAMIFICATION, AND SCOPE

Accordingly, the reader will see that the Electrical Stick Invention provides a highly reliable, lightweight, durable, and easy to use device. The Stick is more accurate and quicker to use than the traditional tape measure.

While my above description contains many specificities, these should not be construed as limitations on the scope of the invention, but rather as an exemplification of one preferred embodiment thereof. Many other variations are possible. For example, the stick could be made slightly larger or smaller depending on preference. Also, there could be different colored sticks to determine the width of the stick used for different sizes in the finished walls or tiling in kitchens or bathrooms. The height indicators could also range higher or lower on the stick depending on preference. Thus the scope of the invention should be determined by the appended claims and their legal equivalents, rather than by the examples given.

I claim:

1. An article suitable for use in installation of electrical boxes to supporting members at uniform heights above floor level and as a measuring device comprising:

a substantially rigid, non adjustable rectangular board having a continuous surface throughout and having height generally between about 55 and 75 inches;

a width of between about 2.25 and 3 inches and a thickness corresponding to the thickness of the wall surface surrounding said box when installed and ranging between about 0.25 inch to about 3 inches;

said board further comprising a first face and a second face to the rear of said first face, each said face having a plurality of markings at predetermined locations which correspond to code requirements for the height of said electrical boxes above floor level; and immediately below each said marking on said board, a height box indicator is located on said board immediately beneath said markings to insure during installation correct positioning of boxes at the desired predetermined heights.

2. The durable piece of material of claim 1 wherein said indicators are indented into both sides.

3. The durable piece of material of claim 1 is made of a strong, fiberglass material.

4. The durable piece of material of claim 1 further includes the width of the finished wall of a structure.

5. The durable piece of material of claim 1 is tall enough to cover all switch and receptacle heights in a structure.

6. The durable piece of material of claim 1 further includes a plurality of clamps off the sides.

7. The durable piece of material of claim 1 further includes a plurality of height indicators off the sides.

8. The durable piece of material of claim 1 further includes a plurality of different colors.

9. The durable piece of material of claim 1 further includes an arrow and a up sign.

10. The durable piece of material of claim 1 further includes a plurality of box indicators.

* * * * *